(12) United States Patent
Henseler et al.

(10) Patent No.: US 10,589,644 B2
(45) Date of Patent: Mar. 17, 2020

(54) APPARATUS FOR USE IN A CHILD SAFETY SEAT

(71) Applicant: BRITAX RÖMER KINDERSICHERHEIT GMBH, Leipheim (DE)

(72) Inventors: Richard Henseler, Ulm (DE); Richard Frank, Elchingen (DE)

(73) Assignee: BRITAX CHILD SAFETY, INC, Fort Mill, SC (US)

( * ) Notice: Subject to any disclaimer, the term of this patent is extended or adjusted under 35 U.S.C. 154(b) by 161 days.

(21) Appl. No.: 15/718,187

(22) Filed: Sep. 28, 2017

(65) Prior Publication Data
US 2018/0086236 A1 Mar. 29, 2018

(30) Foreign Application Priority Data

Sep. 28, 2016 (EP) ................................. 16002094

(51) Int. Cl.
*B60N 2/28* (2006.01)
*B60N 2/26* (2006.01)
(52) U.S. Cl.
CPC ......... *B60N 2/2884* (2013.01); *B60N 2/2863* (2013.01); *B60N 2/2887* (2013.01)
(58) Field of Classification Search
CPC .... B60N 2/2806; B60N 2/286; B60N 2/2863; B60N 2/2884; B60N 2/2887; B60N 2/289; B60N 2/2893; B60N 2/4221; B60N 2/4228
See application file for complete search history.

(56) References Cited

U.S. PATENT DOCUMENTS

| 5,286,085 | A | * | 2/1994 | Minami | B60N 2/2821 297/250.1 |
| 5,290,062 | A | * | 3/1994 | Fohl | B60R 22/1953 280/801.1 |
| 5,290,089 | A | * | 3/1994 | Oleszko | B60N 2/231 297/216.1 |
| 5,487,588 | A | * | 1/1996 | Burleigh | B60N 2/2806 297/250.1 |

(Continued)

FOREIGN PATENT DOCUMENTS

DE 19952771 A1 5/2001

OTHER PUBLICATIONS

Extended search report and written opinion of corresponding European application No. 16002094.7 dated May 4, 2017, all enclosed pages cited.

(Continued)

*Primary Examiner* — Kyle J. Walraed-Sullivan
(74) *Attorney, Agent, or Firm* — Burr & Forman, LLP

(57) ABSTRACT

An apparatus for a child safety seat is disclosed. The apparatus comprises a releasable connector configured to engage with an anchoring point provided in a vehicle to secure the child safety seat to the vehicle, wherein the releasable connector is movable relative to the child safety seat in a first direction; the apparatus further comprises a braking element coupled to the releasable connector and configured to decelerate a movement of the releasable connector in the first direction if an accelerating force acting on the releasable connector in the first direction exceeds a predetermined threshold.

14 Claims, 5 Drawing Sheets

(56) References Cited

U.S. PATENT DOCUMENTS

Figure 1:
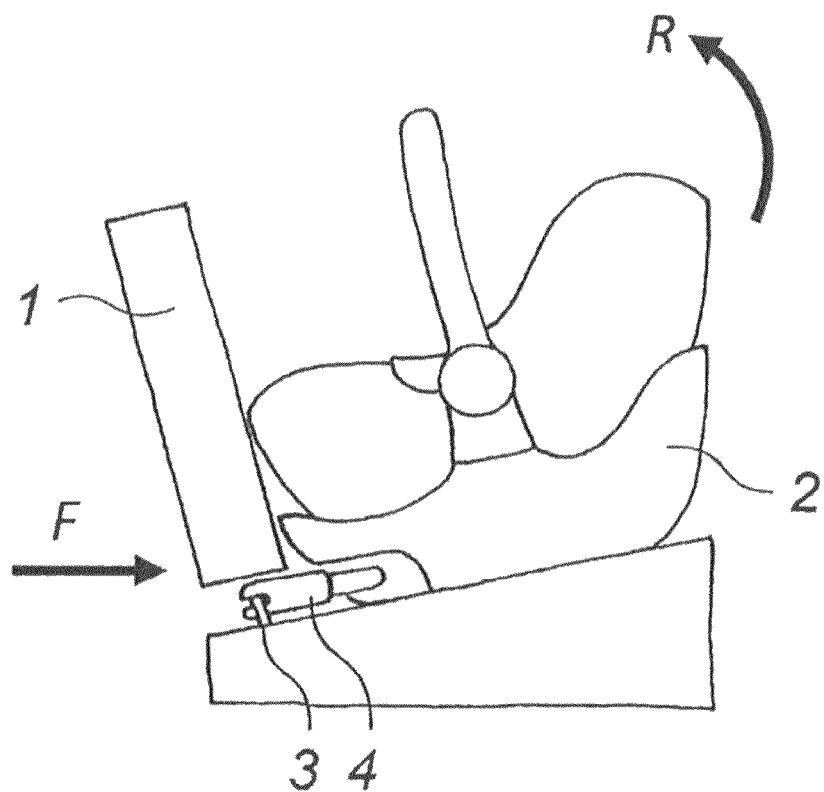

| | | | | |
|---|---|---|---|---|
| 5,538,322 A * | 7/1996 | Cone | B60N 2/2839 | 297/216.11 |
| 5,685,603 A * | 11/1997 | Lane, Jr. | B60N 2/2821 | 297/216.11 |
| 5,690,356 A * | 11/1997 | Lane, Jr. | B60N 2/002 | 180/273 |
| 5,746,467 A * | 5/1998 | Jesadanont | B60N 2/4221 | 296/68.1 |
| 5,884,967 A * | 3/1999 | Gasper | B60N 2/2821 | 297/216.11 |
| 6,017,087 A * | 1/2000 | Anthony | B60N 2/2821 | 297/250.1 |
| 6,022,074 A * | 2/2000 | Swedenklef | B60N 2/2222 | 297/216.14 |
| 6,209,957 B1 * | 4/2001 | Baloga | B60N 2/2821 | 297/250.1 |
| 6,302,481 B1 * | 10/2001 | Swann | B60N 2/067 | 297/216.1 |
| 6,513,870 B1 * | 2/2003 | Takizawa | B60N 2/2812 | 297/216.11 |
| 6,513,873 B2 * | 2/2003 | Tsuda | B60N 2/10 | 297/253 |
| 6,767,057 B2 * | 7/2004 | Neelis | B60N 2/2809 | 297/216.11 |
| 8,662,582 B2 * | 3/2014 | Hall | B60N 2/2809 | 297/216.11 |
| 9,132,754 B2 * | 9/2015 | Mindel | B60N 2/2824 | |
| 2001/0010431 A1 * | 8/2001 | Sasaki | B60N 2/2806 | 297/250.1 |
| 2002/0038968 A1 * | 4/2002 | Maier | B60N 2/2821 | 297/253 |
| 2002/0074840 A1 * | 6/2002 | Nakagawa | B60N 2/2821 | 297/256.16 |
| 2004/0075313 A1 * | 4/2004 | Taoka | B60N 2/2803 | 297/216.16 |
| 2004/0232747 A1 * | 11/2004 | Yamazaki | B60N 2/2806 | 297/250.1 |
| 2005/0212321 A1 * | 9/2005 | Yamamoto | B60N 2/2809 | 296/65.03 |
| 2007/0132286 A1 * | 6/2007 | Taoka | B60N 2/4221 | 297/216.1 |
| 2007/0262636 A1 * | 11/2007 | Gastaldi | B60N 2/2887 | 297/463.1 |
| 2007/0284924 A1 * | 12/2007 | Gold | B60N 2/2821 | 297/253 |
| 2007/0296252 A1 * | 12/2007 | Mattes | B60N 2/242 | 297/216.1 |
| 2009/0243310 A1 * | 10/2009 | Buckingham | B60N 2/2806 | 292/215 |
| 2009/0273215 A1 * | 11/2009 | Barker | B60N 2/2821 | 297/253 |
| 2010/0032997 A1 * | 2/2010 | Gold | B60N 2/2821 | 297/217.1 |
| 2010/0072798 A1 * | 3/2010 | Clement | B60N 2/2893 | 297/253 |
| 2010/0109394 A1 * | 5/2010 | Ruthinowski | B60N 2/2809 | 297/216.11 |
| 2010/0247230 A1 * | 9/2010 | Buckingham | B60N 2/2806 | 403/16 |
| 2011/0089728 A1 * | 4/2011 | Wuerstl | B60N 2/28 | 297/216.11 |
| 2012/0126597 A1 * | 5/2012 | Hall | B60N 2/2809 | 297/250.1 |
| 2013/0088057 A1 * | 4/2013 | Szakelyhidi | B60N 2/2806 | 297/250.1 |
| 2013/0175832 A1 * | 7/2013 | Cheng | B60N 2/2821 | 297/216.11 |
| 2013/0200672 A1 * | 8/2013 | Mo | B60N 2/2887 | 297/256.16 |
| 2013/0307305 A1 * | 11/2013 | Guo | B60N 2/2821 | 297/256.16 |
| 2014/0239684 A1 * | 8/2014 | Mindel | B60N 2/2824 | 297/216.18 |
| 2014/0354021 A1 * | 12/2014 | Sedlack | B60N 2/2821 | 297/216.11 |
| 2015/0084388 A1 * | 3/2015 | Arai | B60N 2/6009 | 297/250.1 |
| 2015/0321639 A1 * | 11/2015 | Horsefall | B60R 22/18 | 24/599.3 |
| 2015/0336481 A1 * | 11/2015 | Horsfall | B60R 22/10 | 297/256.12 |
| 2016/0052426 A1 * | 2/2016 | Zhang | B60N 2/933 | 297/463.1 |
| 2016/0052428 A1 * | 2/2016 | Hessdorfer | B60N 2/43 | 297/411.32 |
| 2016/0121764 A1 * | 5/2016 | Clement | B60N 2/2884 | 297/216.11 |
| 2016/0144752 A1 * | 5/2016 | Frank | B60N 2/2803 | 297/216.11 |
| 2016/0200225 A1 * | 7/2016 | Van Der Veer | B60N 2/2812 | 297/256.16 |
| 2016/0207487 A1 * | 7/2016 | Li | B60N 2/2227 | |
| 2016/0250948 A1 * | 9/2016 | Sekino | B60N 2/6009 | 297/452.48 |
| 2016/0362026 A1 * | 12/2016 | Mizobata | B60N 2/2887 | |
| 2017/0140634 A1 * | 5/2017 | Mindel | G08B 21/22 | |
| 2017/0144624 A1 * | 5/2017 | Geist | B60N 2/28 | |
| 2017/0349066 A1 * | 12/2017 | Fujiwara | B60N 2/2893 | |
| 2018/0015847 A1 * | 1/2018 | Renaudin | B60N 2/2872 | |
| 2018/0029507 A1 * | 2/2018 | Jane Santamaria | B60N 2/2806 | |
| 2019/0054841 A1 * | 2/2019 | Cech | B60N 2/002 | |
| 2019/0077281 A1 * | 3/2019 | Bohm | B60N 2/2824 | |

OTHER PUBLICATIONS

Examination report from corresponding Canadian application No. 2,978,806 dated Oct. 3, 2018, all enclosed pages cited.

Notice of Allowance of corresponding Canadian application No. 2,978,806 dated May 10, 2019, all enclosed pages cited.

* cited by examiner

APPARATUS FOR USE IN A CHILD SAFETY SEAT

CROSS REFERENCE TO RELATED APPLICATIONS

This application claims priority to European application number 16002094.7 filed Sep. 28, 2016, the entire contents of which are incorporated by reference it its entirety.

TECHNICAL FIELD

The present invention relates to child safety seats for use in a vehicle and, more particularly, to an apparatus for a child safety seat, the apparatus being designed to increase the level of protection provided to a child seated in the child safety seat. In particular, the apparatus for a child safety seat is designed to prevent a child seat from being rotated and lifted during a rear impact on the vehicle carrying the child safety seat.

BACKGROUND

Child safety seats are employed for safely transporting children in vehicles, in particular in cars. There is a large variety of child safety seats adapted for transporting children of different age ranges. In Europe, a system of groups has been established for categorizing child safety seats. This system ranges from "Group 0" seats suitable for newborn children via "Group 1"and "Group 2" seats up to "Group 3" seats suitable for children up to twelve years old. Besides the age of a child, other factors that have to be taken into account when choosing a child safety seat for a specific child include the weight and the height of the child.

In principle, a child safety seat can be mounted in a vehicle in one of two orientations: forward-facing, i.e. in such a way that a child positioned in the child safety seat faces the front of the vehicle carrying the child safety seat; or rear-facing, i.e. in such a way that a child positioned in the child safety seat faces the rear of the vehicle carrying the child safety seat. The present invention relates in particular to apparatuses for child safety seats configured for rear-facing installation in the vehicle. The present invention, however, is not limited to rear-facing child safety seats, it might as well be applied to forward-facing child safety seats.

The forces acting on a child sitting in a child safety seat during a crash of the vehicle carrying the child safety seat are influenced by the way the child safety seat is attached to the vehicle, i.e. by how the child safety seat is fixed to the vehicle seat it is placed on. Generally, there a two systems for fixing a child safety seat on a vehicle seat. The first system employs a seat belt provided in the vehicle for securing the child safety seat. In this system, at least one of the seat belts of the vehicle is guided in a prescribed way around or through the child safety seat thus securing the child safety seat in the desired position and orientation. An advantage of this system is that it exclusively makes use of fastening means that are usually present in every vehicle, i.e. the seat belts of the vehicle. Securing a child safety seat with a vehicle seat belt may, however, be cumbersome. Therefore, in practice, many child safety seats of this type are improperly installed in the vehicle. The second system employs fixing means which are provided in the vehicle specifically for securing a child safety seat. In Europe, the ISOFIX system has been introduced for this purpose. A vehicle seat adapted for installation of an ISOFIX child safety seat (i.e. a child safety seat equipped with the ISOFIX system) comprises anchors (ISOFIX anchors) which are provided at the lower end of the seat's seatback at the junction between the seat cushion and the seatback and which are fixedly attached to the seat. The ISOFIX child safety seat comprises connectors or latches (ISOFIX rigid latches) which can be coupled releasably to the anchors. Consequently, using the ISOFIX system a child safety seat can be easily and safely fixed to a vehicle seat. The child safety seat may furthermore comprise a Top Tether, a support leg, or a Rebound Bar, as an anti-rotation device.

The present invention relates in particular to apparatuses for ISOFIX child safety seats. The present invention, however, is not limited to ISOFIX child safety seats, it might as well be applied to other child safety seats having similar means for fixing the child safety seat to a vehicle seat.

In the following, illustrations and descriptions refer to rear-facing ISOFIX child safety seats, which is for reasons of simplicity only and does not limit the invention to apparatuses for rear-facing ISOFIX child safety seats only.

In a car crash involving a rear collision of the vehicle, a child safety seat is pushed towards the seatback of a seat of the vehicle. Due to that, rotary forces will act on the child safety seat, as the center of gravity of the child safety seat is located above the ISOFIX connectors attached to the ISOFIX anchoring points. Thus, the child safety seat will be rotated upwards, resulting in an increased risk of injury for the child in the child safety seat. Further, accelerating forces induced by the rear impact are directly transferred to the child safety seat and, thus, also to the child in the child safety seat.

As already mentioned above, a Rebound Bar may be used to inhibit such a rotation of the child safety seat. However, a Rebound Bar makes a child safety seat heavier and more unhandy, which is particularly disadvantageous when carrying a baby lying in the child safety seat to a vehicle.

BRIEF SUMMARY OF SOME EXAMPLES

Therefore, it is an object of the present invention to provide an apparatus for a child safety seat which reduces the risk of injury for a child in the child safety seat during a rear collision of the vehicle and does not require additional effort and/or action of the user.

This and other objects are achieved by the apparatus for a child safety seat according to claim 1. Advantageous embodiments of the present invention are indicated in subclaims 2 to 15.

According to an aspect of the invention, there is provided an apparatus for a child safety seat, the apparatus comprising a releasable connector configured to engage with an anchoring point provided in a vehicle to secure the child safety seat to the vehicle, wherein the releasable connector is movable in a first direction relative to the child safety seat; and the apparatus further comprises a braking element coupled to the releasable connector and configured to decelerate a movement of the releasable connector in the first direction if an accelerating force acting on the releasable connector in the first direction exceeds a predetermined threshold.

By decelerating the movement of the releasable connector in the first direction as described above, the braking element in accordance with the invention will slow down, impede or even block movement of the releasable connector relative to the child safety seat in the first direction. In accordance with the invention, the braking element may be directly or indirectly coupled to the releasable connector. In particular, in accordance with the invention the braking element may be mounted on a component rigidly coupled to the releasable connector. Preferably, the braking element is movably mounted on said component.

Advantageously, the braking element is pivotally coupled to the releasable connector and configured to rotate about a rotation axis which is spaced apart from the center of gravity of the braking element such that a rotary force acts on the braking element if the releasable connector is accelerated. As the braking element is not supported at its center of gravity but at a point spaced apart from its center of gravity, a rotary force acts on the braking element due to inertial forces acting on the braking element if the releasable connector is accelerated.

Advantageously, the braking element is additionally connected to the releasable connector by an elastic element such that an elastic force caused by the elastic element acts against the rotary force caused by the acceleration of the releasable connector in the first direction, wherein the elastic element preferably is a spring or coil spring. Therefore, the elastic element provides a retention force to hold the braking element at its initial position and/or return the braking element to its initial position.

The elastic element reduces rotation of the braking element such that the braking element does not decelerate the movement of the releasable connector if the rotational forces caused by inertial forces due to acceleration of the releasable connector do not exceed a predetermined threshold which can be set by selecting a suitable elastic element. Thus, the elastic element ensures that the braking element does not hinder the installation of the child safety seat in the vehicle. In particular, the elastic element prevents the braking element from impeding or even blocking movement of the releasable connector when the releasable connector is being retracted to install the child safety seat in a vehicle. At the same time, the elastic element will not prevent the braking element from decelerating the movement of the releasable connector if large accelerating forces caused by a car crash act on the child safety seat in which the releasable connector and the braking element are installed.

Advantageously, the apparatus further comprises a component configured to allow movement of the releasable connector in the first direction and prevent movement of the releasable connector in a second direction opposite to the first direction.

Preferably, the component configured to allow movement of the releasable connector in the first direction and prevent movement of the releasable connector in the second direction opposite to the first direction comprises a ratchet mechanism.

Advantageously, the releasable connector comprises an ISOFIX connector of a child safety seat.

An ISOFIX child safety seat, i.e. a child safety seat configured to be secured to a vehicle by means of the ISOFIX system, comprises ISOFIX connectors or latches (ISOFIX rigid latches) which can releasably be coupled to ISOFIX anchoring points or anchors of a vehicle equipped with the ISOFIX system. The ISOFIX anchoring points are provided at the lower end of the seat's seatback at the junction between the seat cushion and the seatback and are fixedly attached to the seat in the vehicle equipped with the ISOFIX system. The ISOFIX connectors or ISOFIX rigid latches are commonly connected to the child safety seat with a ratchet mechanism or a comparable mechanism in order to adjust the ISOFIX connectors to different seat designs and sizes used in different vehicle types and to allow easy installation of the child safety seat in the vehicle: First, the locking mechanism of the ratchet mechanism can manually be released and the ISOFIX connectors may be fully extended to ease connecting the ISOFIX connectors to the ISOFIX anchoring points. Then, the child safety seat may be moved towards the seatback of the car seat to come in tight contact with the seatback of the car seat. The ratchet mechanism secures the child safety seat as it only allows movement of the ISOFIX connectors in a first direction (i.e. the ISOFIX connectors are allowed to be retracted and, thus, the child safety seat can easily be moved towards the seatback of the car seat) and prevents movement of the ISOFIX connectors in a second direction opposite to the first direction (i.e. the ISOFIX connectors are prevented from extending and, thus, the child safety seat is prevented from moving away from the seatback of the car seat).

Advantageously, the braking element is configured to decelerate the movement of the releasable connector by providing a friction force caused by friction between the braking element and a surface of the child safety seat. More precisely, if the accelerating force acting on the releasable connector in the first direction exceeds a predetermined threshold, the braking element rotates and comes into contact with the surface of the child safety seat such that the contacting surfaces of the braking element and the child safety seat cause friction decelerating the movement of the releasable connector.

Additionally or alternatively, the braking element may rotate and come into contact with the surface of the child safety seat such that the braking element and the surface of the child safety seat become wedged together if the accelerating force acting on the releasable connector in the first direction exceeds a predetermined threshold. Kinetic energy is then additionally absorbed by deforming the surface of the child safety seat and/or the braking element.

According to an embodiment of the invention, the apparatus may further comprise a plate element configured to be mounted on a surface of the child safety seat such that the plate element comes into contact with the braking element if the accelerating force acting on the releasable connector in the first direction exceeds the predetermined threshold.

Advantageously, the braking element is configured to decelerate the movement of the releasable connector by providing a friction force caused by friction between the braking element and the plate element.

According to a further embodiment of the invention, at least a part of the surface of the braking element is serrated, wherein the teeth depth of the serration of the braking element is preferably between 1.0 mm and 3.0 mm, more preferably between 1.5 mm and 2.0 mm.

In this embodiment of the invention, the friction between the braking element and the plate element is increased by providing the braking element with a serrated surface.

Advantageously, the plate element comprises or consists of plastic and the braking element comprises or consists of metal, preferably steel. This combination of materials enables a higher absorption of kinetic energy, as the metal teeth of the braking element scratch and deform the plastic plate element. It is, however, also possible that both the braking element and the plate element comprise or consist of plastic, preferably the braking element comprises or consists of duroplastic plastics and the plate element comprises or consists of plastic which is softer than the duroplastic plastics used for the braking element.

Advantageously, at least a part of the surface of the plate element is serrated which further increases the friction between the braking element and the plate element.

In a further embodiment of the invention, at least parts of the surfaces of both the braking element and the plate element are serrated which additionally increases the friction between the braking element and the plate element as the teeth of the braking element and the plate element will interlock when the braking element touches the plate element.

Advantageously, the plate element comprises or consists of plastic and the braking element comprises or consists of metal.

In this embodiment, kinetic energy is additionally absorbed by the metal teeth of the braking element grating the plastic teeth of the plate element. The teeth depth of the serrations of the braking element and the plate element may be suitably chosen depending on the desired friction force, wherein the teeth depth of the braking element is preferably equal to or larger than the teeth depth of the plate element.

Advantageously, the materials of the braking element and the plate element are selected such that the coefficient of friction of the material of the braking element and the plate element is sufficiently large for the braking element and the plate element to become wedged together if the accelerating force acting on the releasable connector in the first direction exceeds a predetermined threshold. Preferably, the braking element and/or the plate element comprises or consists of rubber. Alternatively or additionally, the surfaces of the braking element and/or the plate element may be rough or even serrated in order to increase the friction between of the braking element and the plate element.

According to a further aspect of the invention, there is provided a child safety seat comprising the apparatus specified above.

Advantageously, the child safety seat is an ISOFIX child safety seat.

Preferably, the child safety seat is configured for a rear-facing installation in the vehicle.

BRIEF DESCRIPTION OF THE SEVERAL VIEW(S) OF THE DRAWINGS

Figure 2A:
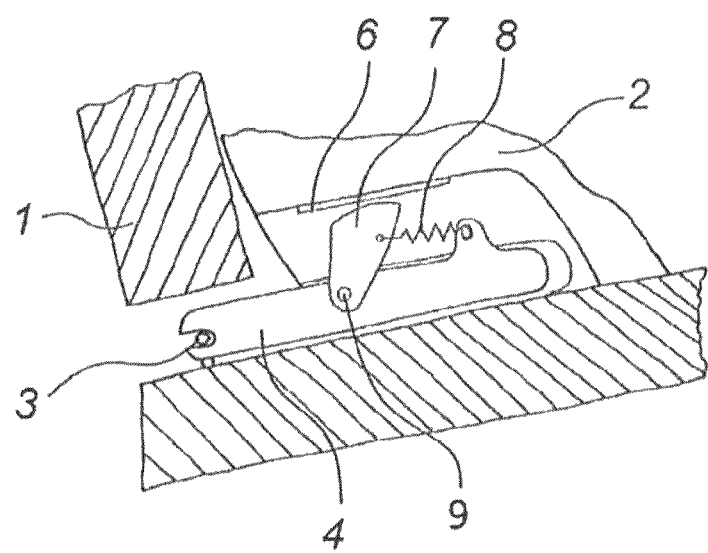
Figure 2B:
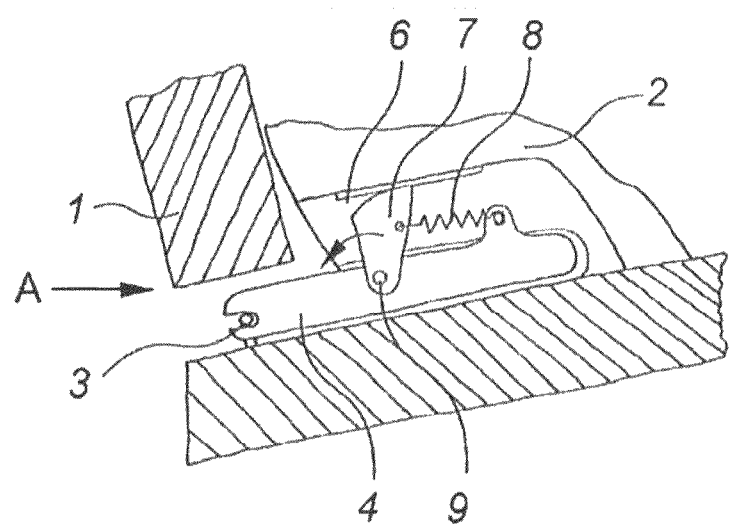
Figure 3:
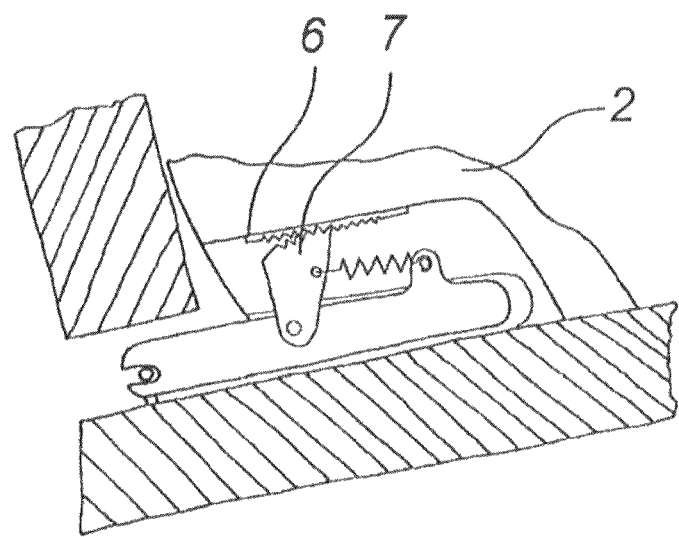
Figure 4:
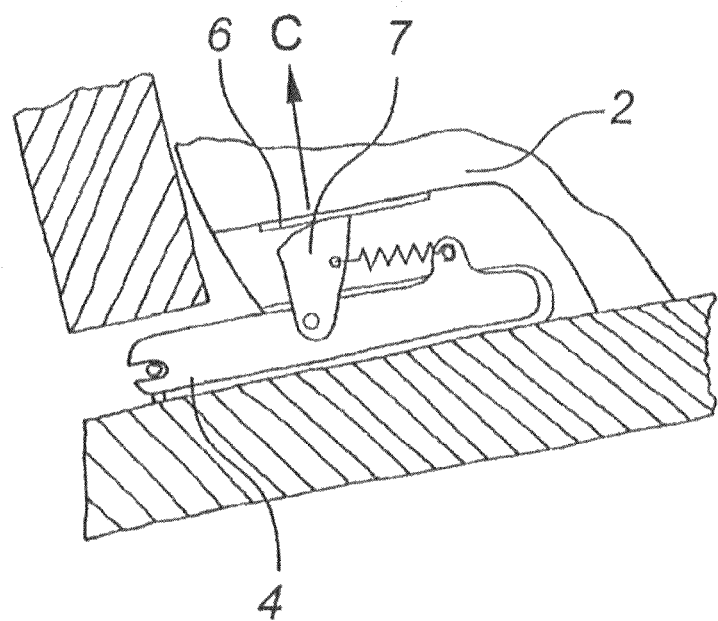

Specific embodiments of the invention will now be described by way of example and with reference to the accompanying drawings, in which:

a. FIG. 1 is a side view of a child safety seat in which the apparatus according to the invention may be employed;

b. FIG. 2A shows an embodiment of an apparatus in accordance with the invention, wherein the braking element is in an initial position;

c. FIG. 2B shows the apparatus of FIG. 2a with the braking element being in a displaced position;

d. FIG. 3 shows a further embodiment of an apparatus in accordance with the invention;

e. FIG. 4 shows a further embodiment of an apparatus in accordance with the invention.

FIG. 1 shows a child safety seat 2 placed on a seat of a vehicle, wherein the orientation of the child safety seat 2 is rear-facing, i.e. a child, when positioned in the child safety seat 2, faces the rear of the vehicle. The child safety seat 2 comprises ISOFIX connectors 4 engaged with, i.e. connected with, ISOFIX anchoring points 3 of the vehicle to secure the child safety seat 2 to the vehicle.

In a car crash involving a rear collision of the vehicle (resulting in a force acting on the vehicle in the direction of arrow F), the child safety seat 2 is pushed towards the seatback 1 of the seat of the vehicle. Due to that, rotary forces will act on the child safety seat 2, as the center of gravity of the child safety seat 2 is located above the ISOFIX connectors 4 attached to the ISOFIX anchoring points 3. Thus, the child safety seat 2 will be rotated upwards (see arrow R in FIG. 1) resulting in an increased risk of injury for the child in the child safety seat 2. Further, accelerating forces induced by the rear impact are directly transferred to the child safety seat 2 and, thus, also to the child in the child safety seat 2.

As described above, in ISOFIX child safety seats 2 the ISOFIX connectors 4 can usually be shifted or displaced relative to the child safety seat 2 in order to facilitate the installation of the child safety seat 2 and to adapt to different geometries of vehicle seats. Thus, an ISOFIX child safety seat 2 usually comprises a mechanism, such as a ratchet mechanism, which allows the ISOFIX connectors 4 to be ejected and to be retracted again. When an ISOFIX child safety seat 2 is properly installed in a vehicle, usually the ISOFIX connectors 4 are not fully retracted.

In a car crash involving a rear collision of the vehicle, inertial forces directed towards the seatback 1 act on the child safety seat 2. As the ratchet mechanism or a similar mechanism connected with the ISOFIX connectors 4 allows the ISOFIX connectors 4 to retract (i.e. move in the first direction in relation to the child safety seat 2), the child safety seat 2 will move towards the seatback 1 (i.e. be pressed into the cushion of the seatback 1), possibly until the ISOFIX connectors 4 are fully retracted. This movement is not impeded, only the cushion of the seatback 1 may decelerate the moving child safety seat 2 before the child safety seat 2 is abruptly stopped when the ISOFIX connectors 4 are fully retracted.

The present invention makes use of the accelerating forces occurring during a car crash for decelerating the movement of the child safety seat 2 towards the seatback in a car crash involving a rear impact. The absorption of kinetic energy of the child safety seat 2 reduces accelerating forces acting on a child positioned in the child safety seat 2 and impedes rotary motions of the child safety seat 2. Thus, risk of injury for the child can be reduced.

FIGS. 2a and 2b show an apparatus for a child safety seat 2 in accordance with an embodiment of the invention. The apparatus comprises a releasable connector 4 configured to be coupled to an anchoring point 3 provided in a vehicle to secure the child safety seat 2 to the vehicle. The apparatus further comprises a component (not shown in FIGS. 2a and 2b) configured to allow movement of the releasable connector 4 in a first direction and prevent movement of the releasable connector 4 in a second direction opposite to the first direction. The component configured to allow movement of the releasable connector 4 in the first direction and prevent movement of the releasable connector 4 in the second direction opposite to the first direction preferably comprises a ratchet mechanism. The apparatus further comprises a braking element 7 pivotally coupled to the releasable connector 4 and an elastic element 8, in particular a spring or coil spring. The apparatus preferably comprises a plate element 6 configured to be attached to a base or lower portion of the child safety seat 2.

The braking element 7 is rotatably supported by a swivel 9 provided on the releasable connector 4 such that the swivel 9, which is the center of rotation, is spaced apart from the center of gravity of the braking element 7. Thus, inertial forces will cause the braking element 7 to rotate if the releasable connector 4 is accelerated in the direction indicated by arrow A (see FIG. 2b). When the braking element 7 comes into contact with the plate element 6 (or a surface of the child safety seat 2 if no plate element is provided), movement of the releasable connector 4 will be decelerated.

In the initial position of the braking element 7, when the releasable connector 4 is not accelerated, the braking element 7 is not in contact with the plate element 6 and does not impede movements of the releasable connector 4 (see FIG. 2a).

The braking element 7 preferably has a pivot bearing at one side and a rounded surface on the opposite side, wherein the pivot or swivel 9 provided on the releasable connector 4 is configured to be inserted into the pivot bearing of the braking element 7. The braking element 7 preferably has a tapered form, wherein its width tapers from the side having the rounded surface towards the side having the pivot bearing. The rounded surface of braking element 7 is configured to come into contact with the plate element 6 (or a surface of the child safety seat 2 if no plate element is provided) and generate friction, wherein the curvature of the braking element is formed depending on the desired amount of friction and/or grip.

The braking element 7 may decelerate the movement of the releasable connector 4 by providing a friction force caused by friction between the braking element 7 and the plate element 6 (or the surface of the child safety seat 2). More precisely, if the accelerating force acting on the releasable connector 4 in the first direction exceeds a predetermined threshold (defined, amongst others, by the flexibility of the elastic element 8), the braking element 7 rotates and comes into contact with the surface of the plate element 6 such that the contacting surfaces of the braking element 7 and the plate element 6 cause friction decelerating the movement of the releasable connector 4.

Alternatively or additionally, the braking element 7 may rotate and come into contact with the surface of the plate element 6 such that the braking element 7 and the plate element 6 become wedged together if the accelerating force acting on the releasable connector 4 in the first direction exceeds a predetermined threshold. Kinetic energy may then be absorbed by deforming the plate element 6, a part of child safety seat 2 adjacent to the plate element 6 and/or the braking element 7.

The spring 8 forms an additional connection between the braking element 7 and the releasable connector 4 to inhibit or decelerate rotations caused by an acceleration force acting on the releasable connector 4 in the first direction. More precisely, the spring 8 reduces rotation of the braking element 7 such that the braking element 7 does not decelerate the movement of the releasable connector 4 if the rotational forces caused by inertial forces due to acceleration of the releasable connector 4 do not exceed a predetermined threshold which can be set by selecting a spring 8 having a suitable spring stiffness. Thus, the spring 8 provides a retention force for holding the braking element 7 at its initial position and/or returning the braking element 7 to its initial position. Only after the rotational forces caused by the acceleration of the releasable connector 4 have exceeded a predetermined threshold, the braking element may rotate far enough to touch the plate element 6.

Accordingly, the spring 8 ensures that the braking element 7 does not hinder the installation of the child safety seat 2 in the vehicle. In particular, the spring 8 prevents the braking element 7 from impeding or even blocking movement of the releasable connector 4 when the releasable connector 4 is extended and needs to be retracted in order to install the child safety seat 2 in a vehicle. At the same time, the spring 8 will not prevent the braking element 7 from decelerating the movement of the releasable connector 4 if large accelerating forces caused by a car crash act on the child safety seat 2 in which the releasable connector 4 and the braking element 7 are installed.

FIG. 3 shows a further embodiment of an apparatus in accordance with the present invention which is similar to the embodiment shown in FIGS. 2a and 2b. However, in the embodiment shown in FIG. 3, at least parts of the surfaces of the braking element 7 and the plate element 6 are serrated. Though FIG. 3 shows an embodiment wherein at least parts of the surfaces of both the braking element 7 and the plate element 6 are serrated, it is also possible that only the braking element 7 is provided with an at least partly serrated surface and the plate element 6 has a smooth or a rough, but not serrated surface.

In the embodiment shown in FIG. 3, the friction between the braking element 7 and the plate element 6 is increased by providing the braking element 7 and the plate element 6 with an at least partly serrated surface. In this embodiment, friction between the braking element 7 and the plate element 6 is increased as the teeth of the braking element 7 and the teeth the plate element 6 will interlock when the braking element 7 touches the plate element 6. The teeth depth of the serration of the braking element 7 is preferably between 1.0 mm and 3.0 mm, more preferably between 1.5 mm and 2.0 mm. The teeth depth of the serration of the plate element 6 is preferably equal to or smaller than the teeth depth of the serration of the braking element 7.

Advantageously, the plate element 6 comprises or consists of plastic and the braking element 7 comprises or consists of metal, preferably steel. This combination of materials further increases the absorption of kinetic energy, as the metal teeth of the braking element 7 grate, scratch and/or deform the plastic teeth of the plate element 6 or the plate element 6 as a whole. It is, however, also possible that both the braking element 7 and the plate element 6 comprise or consist of plastic, preferably the braking element 7 comprises or consists of duroplastic plastics and the plate element 6 comprises or consists of plastic which is softer than the duroplastic plastics used for the braking element 7.

FIG. 4 shows a further embodiment of the present invention which is similar to the embodiment shown in FIGS. 2a and 2b. In this embodiment, the materials of the braking element 7 and the plate element 6 are selected such that the coefficient of friction of the materials of the braking element 7 and the plate element 6 is sufficiently large for the braking element 7 and the plate element 6 to become wedged together if the accelerating force acting on the releasable connector 4 in the first direction exceeds a predetermined threshold. Preferably, the braking element 7 and/or the plate element 6 comprises or consists of rubber. Alternatively or additionally, the surfaces of the braking element 7 and/or the plate element 6 may be rough or even serrated in order to increase the friction between of the braking element 7 and the plate element 6.

In this embodiment, additional kinetic energy is absorbed by converting the kinetic energy into deformation energy of one or more parts of the child safety seat 2 including the apparatus according to the invention. Accordingly, the plate element 6, the releasable connector 4, the ratchet mechanism, and/or a lower part or base of the child safety seat which is adjacent to the plate element 6 may be deformed (symbolized by the arrow C in FIG. 4). Preferably, the material of the lower part or base of the child safety seat 2 adjacent to the plate element 6 is adapted to absorb kinetic energy by plastic deformation. For example, a rubber element may be inserted in the lower part or base of the child safety seat 2.

The invention claimed is:

1. An apparatus for a child safety seat, the apparatus comprising:
   a releasable connector configured to engage with an anchoring point provided in a vehicle to secure the child safety seat to the vehicle, wherein the releasable connector is movable relative to the child safety seat in a first direction; and
   a braking element coupled to the releasable connector and configured to decelerate a movement of the releasable connector in the first direction in response to an accelerating force, acting on the releasable connector in the first direction, exceeding a predetermined threshold,
   wherein the braking element is pivotally coupled to the releasable connector and is configured to rotate about a rotation axis of the braking element which is spaced apart from the center of gravity of the braking element such that a rotary force acts on the braking element in response to the releasable connector accelerating.

2. The apparatus of claim 1, wherein the braking element is additionally connected to the releasable connector by an elastic element such that an elastic force caused by the elastic element acts against the rotary force caused by an acceleration of the releasable connector in the first direction.

3. The apparatus of claim 2, wherein the elastic element is a spring.

4. The apparatus of claim 1, wherein the releasable connector comprises an ISOFIX connector of a child safety seat.

5. The apparatus of claim 1, wherein the braking element is configured to decelerate the movement of the releasable connector by providing a friction force caused by friction between the braking element and a surface of the child safety seat.

6. The apparatus of claim 1, further comprising a plate element configured to be mounted on a surface of the child safety seat such that the plate element comes into contact with the braking element in response to the accelerating force, acting on the releasable connector in the first direction, exceeding the predetermined threshold.

7. The apparatus of claim 6, wherein at least a part of the surface of the braking element is serrated.

8. The apparatus of claim 6, wherein at least a part of the surface of the plate element is serrated.

9. The apparatus of claim 6, wherein the plate element comprises plastic and the braking element comprises metal.

10. The apparatus of claim 6, wherein materials of the braking element and the plate element are selected such that a coefficient of friction of the material of the braking element and the plate element is a predefined amount for the braking element and the plate element to become wedged together in response to the accelerating force, acting on the releasable connector in the first direction, exceeding a predetermined threshold.

11. A child safety seat comprising an apparatus, the apparatus comprising:
    a releasable connector configured to engage with an anchoring point provided in a vehicle to secure the child safety seat to the vehicle, wherein the releasable connector is movable relative to the child safety seat in a first direction; and
    a braking element coupled to the releasable connector and configured to decelerate a movement of the releasable connector in the first direction in response to an accelerating force, acting on the releasable connector in the first direction, exceeding a predetermined threshold,
    wherein the braking element is pivotally coupled to the releasable connector and is configured to rotate about a rotation axis of the braking element which is spaced apart from the center of gravity of the braking element such that a rotary force acts on the braking element in response to the releasable connector accelerating.

12. The child safety seat of claim 11, wherein the child safety seat is configured for a rear-facing installation in the vehicle.

13. The child safety seat of claim 11, wherein the braking element is additionally connected to the releasable connector by an elastic element such that an elastic force caused by the elastic element acts against the rotary force caused by an acceleration of the releasable connector in the first direction.

14. The child safety seat of claim 13, wherein the elastic element is a spring.

* * * * *